2,955,120
// Patented Oct. 4, 1960

2,955,120
PRESERVATION OF SOAP COMPOSITIONS

Douglas Holness, Orpington, and Bertram James Frank Hudson, Neston, Wirral, England, assignors to Lever Brothers Company, New York, N.Y., a corporation of Maine No Drawing. Filed Aug. 22, 1957, Ser. No. 679,757

Claims priority, application Great Britain Aug. 28, 1956

8 Claims. (Cl. 260—398.5)

This invention relates to soap compositions containing preservatives, and to new soap preservatives.

It has been found that the tendency of soap compositions to deteriorate in odour during storage can be retarded by the incorporation of certain substituted hydrazones.

The soap compositions of the present invention contain a small amount of hydrazone having the general formula $RXNH.N=CR_1R_2$, in which R and $R_1$ are each an alkyl, aryl or aralkyl group, $R_2$ is hydrogen or an alkyl, aryl or aralkyl group, R contains not more than 20 carbon atoms, and X is either —CO— or —$SO_2$—.

The radicals R, $R_1$ and $R_2$ may themselves be substituted and substituents which may be present are for example hydroxyl, alkoxyl or halogen or any other groups such as carboxyl which do not confer odour, colour or instability to the molecule so formed: moreover R, $R_1$ and $R_2$ can be unsaturated. The hydrazone molecule may contain a further substituent group of the general formula —$XNHN=CR_1R_2$, in which the particular radicals X, $R_1$ and $R_2$ present may be either the same or different from those in the remainder of the molecule. The groups $R_1$ and $R_2$ may be joined so that they form a cyclic system with the carbon to which they are attached. Preferably $R_1$ and $R_2$ taken together contain not more than 20 carbon atoms.

The hydrazones to be used in the compositions of the invention are in general readily prepared by the interaction of the hydrazides $RCONHNH_2$ (acyl hydrazines) or $RSO_2NHNH_2$ (sulphonyl hydrazines) and the aldehydes or ketones $R_1COR_2$. The reaction takes place on heating gently a mixture of the reactants, a solvent being present if desired. The products can be recrystallised from an appropriate solvent and, when purified, are in general white odourless substances.

The hydrazones used preferably have molecular weights within the range of from 150 to 500. Examples of hydrazones having suitable combinations of substituents are those in which R and $R_1$ are each alkyl: $R_2$ can then for instance be hydrogen or alkyl. With R an alkyl group, $R_1$ can be aryl or aralkyl. When R is an aryl group, $R_1$ can be alkyl; $R_2$ can for instance then be hydrogen or alkyl. Another combination is where R is an alkyl group and $R_1$ and $R_2$ are joined so that with the carbon atom to which they are attached they form a cyclic system, for instance, a cyclohexylidene group. Examples of suitable hydrazones are those derived from benzoyl hydrazine or lauroyl hydrazine, for instance, N-benzoyl-N'-isopropylidene hydrazine, $$C_6H_5CO.NH.N=C(CH_3)_2$$

(that is, acetone benzoylhydrazone) and N-lauroyl-N'-isopropylidene hydrazine, $C_{11}H_{23}CO.NH.N=C(CH_3)_2$ (acetone lauroylhydrazone), which have already been described in the chemical literature. Other suitable hydrazones are the following new compounds, a method for the preparation of each of which is also given.

N-Lauroyl-N'-heptylidene hydrazine, $$C_{11}H_{23}CO.NH.N=CH.C_6H_{13}$$

This compound, M.P. 79°–80° C. was obtained by the condensation of n-heptaldehyde with lauroyl hydrazine in boiling ethanol, followed by recrystallisation from ethanol.

N-($\gamma$-hydroxybutyryl)-N'-isopropylidene hydrazine, $$CH_2OH.(CH_2)_2CO.NH.N=C(CH_3)_2$$

A mixture of hydrazine hydrate (25 g.) and $\gamma$-butyrolactone (43 g.) was heated on a steam-bath for 1 hour. The crude $\gamma$-hydroxybutyryl hydrazine obtained was recrystallised from methanol in white prisms (50.5 g.), M.P. 95°–98° C. This intermediate was heated under reflux for 1 hour with excess acetone, giving a crude product which on recrystallisation from benzeneacetone mixture gave the required hydrazone, M.P. 80°–82° C.

N-Lauroyl-N'-($\alpha$-amylcinnamylidene) hydrazine, $$C_{11}H_{23}CO.NH.N=CH.C(C_5H_{11})=CH.C_6H_5$$

When lauroyl hydrazine was condensed in boiling ethanol with $\alpha$-amylcinnamaldehyde, this hydrazone was obtained, M.P. 84–5° C. after recrystallisation.

N-(p-toluenesulphonyl)-N'-(2:3:4:5:6-pentahydroxy-hexylidene) hydrazine, $$CH_3C_6H_4.SO_2.NH.N=CH.(CHOH)_4.CH_2OH$$

This hydrazone was obtained by the condensation of p-toluenesulphonyl hydrazine with glucose in aqueous methanol, and had M.P. 163–5° C. (decomp.) after recrystallisation from aqueous methanol.

N-($\gamma$-hydroxybutyryl)-N'-anisylidene hydrazine, $$CH_2OH.(CH_2)_2CO.NH.N=CH.C_6H_4OCH_3$$

$\gamma$-Hydroxybutyryl hydrazine, prepared as described above, was condensed with anisaldehyde, giving this hydrazone as white prisms, M.P. 105–10° C. after recrystallisation from aqueous methanol.

N-($\gamma$-hydroxybutyryl)-N'-cyclohexylidene hydrazine, $CH_2OH.(CH_2)_2CO.NH.N=C_6H_{10}$: This hydrazone was prepared by the condensation of $\gamma$-hydroxybutyryl hydrazine with cyclohexanone, M.P. 76°–81° C. on recrystallisation from benzene.

Di-isopropylidene tartaric dihydrazide, $$(CH_3)_2C=N.NH.CO.CHOH.CHOH.CO.NH.N=C(CH_3)_2$$

A mixture of diethyl tartrate (20.6 g.) and hydrazine hydrate (20 g.) was heated for 2 hours under reflux. The tartaric dihydrazide, $$(CHOH.CHOH.CO.NH.NH_2)_2$$

which separated out on cooling was filtered off and gave white prisms, M.P. 178–82° C. on recrystallisation from aqueous ethanol. When a solution of this hydrazide in excess acetone was refluxed for 2 hours, the required hydrazone, M.P. 280° C., separated out.

These new hydrazone compounds which are useful as soap preservatives are themselves a part of the invention.

The hydrazones used in the compositions of the invention generally give satisfactory results even when incorporated in a soap composition in an amount as low as 0.02% by weight of the soap present. Amounts of up to 5% can be used (and even higher amounts will of course give the preservative effect), but it is preferable to use amounts lying within the range of from 0.1% to 1%.

The compositons of the present invention comprise at least one of the specified hydrazones and soap. It is not a critical feature of the invention that any particular soap be used. Rather the term soap is used to mean any alkali metal salt of any of the straight, branched, saturated or unsaturated fatty acids containing from about 10 to about 22 carbon atoms.

The following examples illustrate soap compositions of the invention.

Example 1

A soap was prepared from a fat charge consisting of 63% by weight of tallow, 20% palm kernel oil, 15% groundnut acid oil and 2% rosin. The soap was dried and 0.72% of N-lauroyl-N'-heptylidene hydrazine by weight of the soap was added to the soap during milling at the same time as a perfume, an opacifying agent and a whitening agent. The soap was then plodded and stamped into tablets containing 78% of fatty matter. After being used for hand-washing, and then being exposed to ultra-violet light for 2 hours, the odour of the tablets was superior to that of similarly prepared and treated control tablets containing no hydrazone.

Example 2

To the dried soap base of Example 1 was added 0.25% of N-($\gamma$-hydroxybutyryl)-N'-isopropylidene hydrazine: the mixture was milled, plodded and stamped into tablets. These tablets were used for hand-washing and then exposed to ultra-violet light for 2 hours. The odour of the tablets was superior to that of similarly prepared and treated control tablets containing no hydrazone.

Similar results were observed when as hydrazone there was used 0.25% of N-lauroyl-N'-isopropylidene hydrazine, N(p-toluenesulphonyl)-N'-(2:3:4:5:6-pentahydroxylhexylidene) hydrazine, N-($\gamma$-hydroxybutyryl)-N'-anisylidene hydrazine, N-($\gamma$-hydroxybutyryl)-N'-cyclohexylidene hydrazine, or N:N'-di-isopropylidene tartaric dihydrazide; and also when there was used 0.41% of N-benzoyl-N'-isopropylidene hydrazine, or 0.93% of N-lauroyl-N'-($\alpha$-amylcinnamylidene) hydrazine.

Example 3

A soap was prepared from a fat charge consisting of 30.5% by weight of tallow, 41% palm oil, 23% palm kernel oil, 3.5% groundnut oil and 2% rosin. This soap was dried, and 0.59% by weight of N-lauroyl-N'-isopropylidene hydrazine incorporated in it: the soap composition obtained was treated and tested as in Example 2. The improvement in odour over that of a similarly treated control containing no hydrazone was marked.

We claim:

1. A soap composition which contains a small amount of a hydrazone having the general formula $$RXNH—N=CR_1R_2$$

in which R and $R_1$ are each selected from the class consisting of alkyl, aryl and aralkyl groups, $R_2$ is selected from the class consisting of hydrogen, alkyl, aryl and aralkyl groups, X is selected from the class consisting of —CO— and —$SO_2$—, with R containing not more than 20 carbon atoms, and $R_1$ and $R_2$ taken together containing not more than 20 carbon atoms.

2. A soap composition as claimed in claim 1 containing from 0.1 to 1% of the hydrazone by weight of soap.

3. A soap composition as claimed in claim 1 in which the hydrazone has a molecular weight within the range of from 150 to 500.

4. A soap composition which contains from 0.1 to 1% of N-lauroyl-N'-heptylidene hydrazine by weight of soap.

5. A soap composition which contains from 0.1 to 1% of N-($\gamma$-hydroxybutyryl)-N'-isopropylidene hydrazine by weight of soap.

6. A soap composition which contains from 0.1 to 1% of N-lauroyl-N'-isopropylidene hydrazine by weight of soap.

7. A soap composition which contains from 0.1 to 1% of (N-p-toluenesulphonyl)-N'-(2:3:4:5:6-pentahydroxylhexylidene) hydrazine by weight of soap.

8. A soap composition which contains from 0.1 to 1% of N-($\gamma$-hydroxybutyryl)-N'-cyclohexylidene hydrazine by weight of soap.

References Cited in the file of this patent

UNITED STATES PATENTS

| | | |
|---|---|---|
| 1,973,724 | Perkins et al. | Sept. 18, 1934 |
| 2,043,259 | Missbach | June 9, 1936 |
| 2,808,416 | Bell | Oct. 1, 1957 |

FOREIGN PATENTS

| | | |
|---|---|---|
| 423,938 | Great Britain | Feb. 11, 1935 |